(12) United States Patent
Kojo et al.

(10) Patent No.: US 8,620,311 B2
(45) Date of Patent: Dec. 31, 2013

(54) COMMUNICATION SYSTEM FOR CARRYING OUT CALL CONTROL OF COMMUNICATION TERMINAL AND COMMUNICATION METHOD THEREFOR

(75) Inventors: Yu Kojo, Kawasaki (JP); Yasuyuki Honda, Yokohama (JP); Michiko Wakui, Yokosuka (JP); Masami Yabusaki, Kashiwa (JP)

(73) Assignee: NTT DoCoMo, Inc., Chiyoda-ku, Tokyo (JP)

( * ) Notice: Subject to any disclaimer, the term of this patent is extended or adjusted under 35 U.S.C. 154(b) by 99 days.

(21) Appl. No.: 13/062,169

(22) PCT Filed: Sep. 2, 2009

(86) PCT No.: PCT/JP2009/004324
§ 371 (c)(1),
(2), (4) Date: Mar. 3, 2011

(87) PCT Pub. No.: WO2010/026748
PCT Pub. Date: Mar. 11, 2010

(65) Prior Publication Data
US 2011/0159889 A1   Jun. 30, 2011

(30) Foreign Application Priority Data
Sep. 4, 2008   (JP) .................................. 2008-226859

(51) Int. Cl.
*H04W 4/00* (2009.01)

(52) U.S. Cl.
USPC ............ 455/433; 455/461; 455/462; 455/463

(58) Field of Classification Search
USPC ......................................... 455/433, 461–463
See application file for complete search history.

(56) References Cited

U.S. PATENT DOCUMENTS 7,190,969 B1 * 3/2007 Oh et al. ........................ 455/551
7,610,047 B2 * 10/2009 Hicks et al. ................... 455/433
(Continued)

FOREIGN PATENT DOCUMENTS

| CN | 1859477 A | 11/2006 |
| JP | 06-244954 A | 9/1994 |

(Continued)

OTHER PUBLICATIONS

PCT/JP2009/004324—PCT/IB/338, dated Apr. 21, 2011, 1 page.
(Continued)

*Primary Examiner* — Liton Miah
(74) *Attorney, Agent, or Firm* — Crowell & Moring LLP

(57) ABSTRACT

There is provided a communication system and a communication method of making available both a shared telephone number shared by multiple communication terminals and an individual telephone number dedicated to a user's own terminal in a single communication terminal. A shared managing unit 11 of a communication system 1 manages terminal identifiers 1 and 3 identifying each of a plurality of communication terminals 30a and 30b to which a shared telephone number is assigned in correlation with the shared telephone number. An individual managing unit 12 manages a terminal identifier 2 identifying a communication terminal 30b to which an individual telephone number is assigned is correlation with the individual telephone number. A user information managing unit 13 manages user information including base station information of communication terminals identified by the identifier every terminal identifiers 1, 2, and 3. A call control device 20 carries out call control of communication terminals 30b, to which the shared telephone number and an individual telephone number are assigned, using this information.

8 Claims, 7 Drawing Sheets

(56) References Cited

U.S. PATENT DOCUMENTS

| | | | |
|---|---|---|---|
| 7,657,270 B2* | 2/2010 | Hicks et al. | 455/461 |
| 2002/0077129 A1* | 6/2002 | Kikuta et al. | 455/461 |
| 2003/0125072 A1* | 7/2003 | Dent | 455/551 |
| 2004/0162092 A1* | 8/2004 | Marsico et al. | 455/463 |
| 2004/0180676 A1* | 9/2004 | Haumont et al. | 455/461 |
| 2005/0190789 A1* | 9/2005 | Salkini et al. | 370/466 |
| 2006/0153342 A1 | 7/2006 | Sasaki | |
| 2009/0270087 A1 | 10/2009 | Yamakita et al. | |

FOREIGN PATENT DOCUMENTS

| | | |
|---|---|---|
| JP | 07-250380 A | 9/1995 |
| JP | 09-084088 A | 3/1997 |
| JP | 10-243460 A | 9/1998 |
| JP | 11-136714 A | 5/1999 |
| JP | 3131867 B2 | 2/2001 |
| JP | 2003-111140 A | 4/2003 |
| JP | 2006-191474 A | 7/2006 |
| JP | 2008-078993 A | 4/2008 |
| JP | 2008-125136 A | 5/2008 |
| JP | 2008-148002 A | 6/2008 |
| WO | WO 2007/046253 A1 | 4/2007 |

OTHER PUBLICATIONS

PCT/JP2009/004324—PCT/IB/373, dated Apr. 12, 2011, 1 page.
PCT/JP2009/004324—PCT/ISA/237, Translation, 5 pages.
Chinese Office Action w/English translation, dated Jan. 4, 2013, 18 pages total.
Japanese Office Action w/Translation, dated Aug. 14, 2012, 5 pages total.
Japanese Office Action w/English translation, dated Nov. 20, 2012, 4 pages total.
Chinese Office Action dated Jul. 2, 2013 with English translation (Eleven (11) pages).

\* cited by examiner

F I G. 4
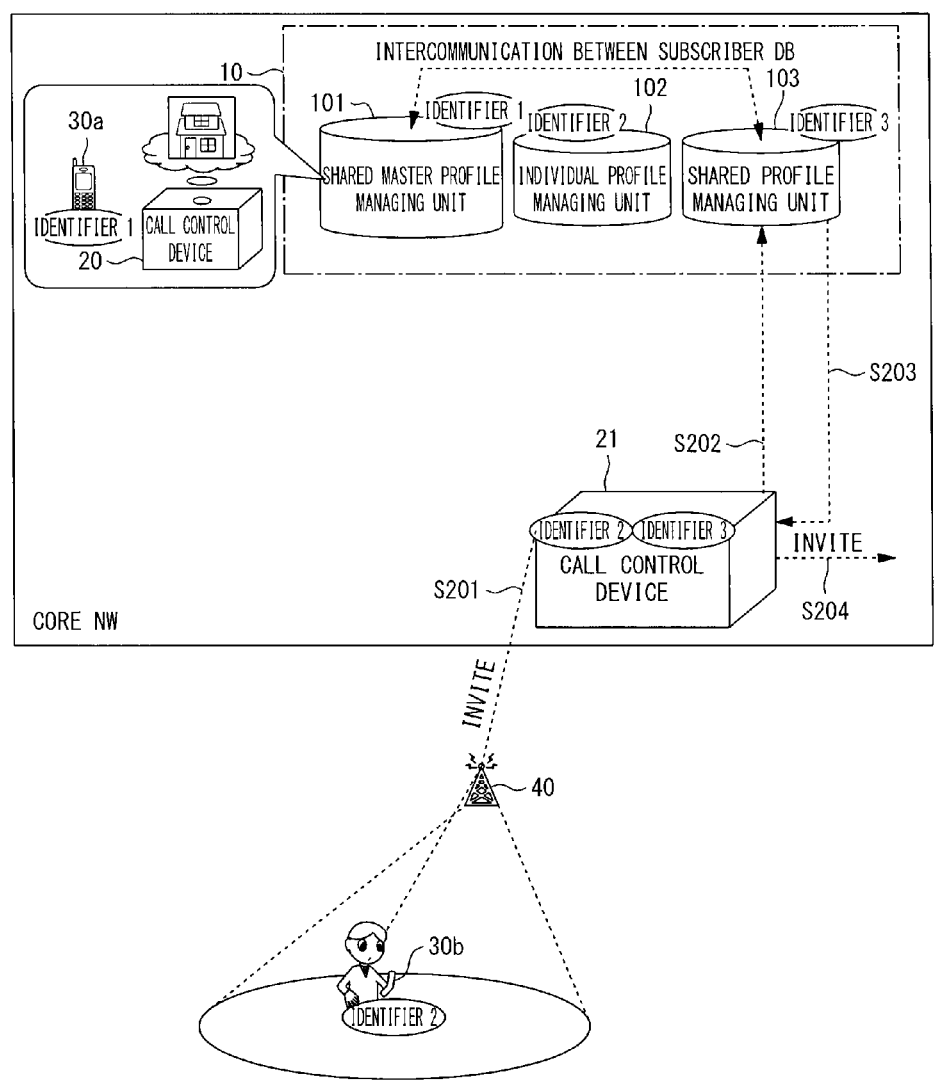

COMMUNICATION SYSTEM FOR CARRYING OUT CALL CONTROL OF COMMUNICATION TERMINAL AND COMMUNICATION METHOD THEREFOR

TECHNICAL FIELD

The present invention relates to a communication system and a communication method, which provides a communication terminal usable multiple telephone numbers.

BACKGROUND ART

With the recent popularization of mobile communication terminals, there is need for using multiple telephone numbers depending on purpose. In order to meet this need, a user conventionally carried mobile communication terminals as many as telephone numbers he desired to use. However, since carrying around multiple mobile communication terminals is very inconvenient for the user, it has been proposed to make multiple telephone numbers available for one mobile communication terminal (see Patent Documents 1, 2, and 3, for example).

In addition, it has also been proposed to share a telephone number such as an extension number or the like with multiple telephones (see Patent Document 4, for example).

PRIOR ART DOCUMENTS

Patent Documents

Patent Document 1: JP Laid-Open Patent Publication H6-244954 A
Patent Document 2: JP Laid-Open Patent Publication H9-84088 A
Patent Document 3: JP Laid-Open Patent Publication 2003-111140 A
Patent Document 4: JP Laid-Open Patent Publication H11-136714 A

DISCLOSURE OF THE INVENTION

Problem to be Solved by the Invention

In recent years, there is a need for using shared telephone numbers shared by members of the family or the like such as a fixed telephone for family use, other than normal individual telephone numbers uniquely assigned to the mobile communication terminals.

However, while the above Patent Documents disclose a method of assigning multiple telephone numbers to a single terminal and a method of assigning a shared telephone number to multiple terminals, they do not disclose a method of making a use available both individually assigned basic numbers (individual telephone numbers) and a shared telephone number as a second number.

In the conventional mobile communication technology, it is common to carry out identification and call control of a mobile communication terminal by assigning one terminal identifier to a single mobile communication terminal (single user) and installing in the mobile communication terminal a recording medium called a Subscriber Identity Module (SIM) card into which the terminal identifier is registered. Accordingly, for both a shared telephone number and an individual telephone number to make available to a single communication terminal, there is a problem in the management method and call control method for terminal identifiers and telephone numbers The present invention has been made to solve the above problems, and it is an objective of the present invention to provide a communication system and a communication method, which allow both a shared telephone number shared by multiple communication terminals and an individual telephone number dedicated to user's own terminal.

Solution to the Problem

In order to resolve the problems given above, an embodiment of the present invention provides a communication system for carrying out call control of a communication terminal to which a shared telephone number shared by a plurality of communication terminals and an individual telephone number dedicated to a user's own terminal are assigned; the communication terminal comprising: A semiconductor device comprising:

a shared managing means for managing terminal identifiers identifying each of a plurality of communication terminals, respectively, to which the shared telephone number is assigned in correlation with the shared telephone number;

an individual managing means for managing a terminal identifier identifying the terminal identifier to which the individual telephone number is assigned; in correlation with the individual telephone number; and a user information managing means for managing user information including base station information of communication terminals identified by the terminal identifiers for every terminal identifiers managed by the shared managing means and the individual managing means.

According to this configuration, the communication system manages terminal identifiers identifying respective multiple communication terminals, respectively, to which the shared telephone number is assigned in correlation with the shared telephone number, manages a terminal identifier identifying a communication terminal to which the individual telephone number is assigned in correlation with the individual telephone number, and manages user information such as location information of a communication terminal and the like of these terminal identifiers. Based on this information, this makes it possible to making incoming and outgoing calls by any of the shared telephone number or the individual telephone number from/to the communication terminal, thus making available both the shared telephone number and the individual telephone number for a single communication terminal.

Alternatively, in the above communication system, there may be two kinds of terminal identifiers indentifying communication terminals to which the shared telephone number and the individual telephone number are assigned, wherein one terminal identifier with which the shared telephone number is managed by the shared managing means being connected, and the other terminal identifier with which the individual telephone number is managed by the individual managing means being connected.

According to this configuration, preparation of two kinds of terminal identifiers indentifying communication terminals, one for a shared telephone number and the other for individual telephone number, allows to prevent location information of the communication terminals that share the shared telephone number from being overwritten during location registration, and accurately confirm the location information of the respective communication terminals that share the shared telephone number.

The above communication system may further include a calling means for calling a predetermined communication terminal by confirming by the base station information managing means base station information of the communication terminal out of the communication terminals identified by terminal identifiers, managed by the shared managing means in correlation with the shared telephone number when an incoming call to the shared telephone number is received, and Calling a predetermined communication terminal by confirming by the user information managing means base station information of a communication terminal identified by a terminal identifier managed by the individual managing means in correlation with the shared telephone number, when an incoming call to the individual telephone number is received.

According to this configuration, both in the case where an incoming call to the shared telephone number is received and in the case where an incoming call to the individual telephone number is received, it enables control of the incoming call to the communication terminals to which the shared telephone number and the individual telephone number are assigned, and using both the shared telephone number and the individual telephone number in a single communication terminal.

Furthermore, in the above communication system, the calling out means may call a predetermined communication terminal to be called next of the communication terminals identified by the terminal identifiers managed by the shared managing means when there is no answer from the communication terminal called when the incoming call to the shared telephone number is received within a predetermined time.

According to this configuration, since a predetermined communication terminal to be called next out of the communication terminals identified by the terminal identifiers managed by the shared managing means is called if there is no answer from the communication terminal called within a predetermined time the incoming call to the shared telephone number is received, the user of any one of the communication terminals sharing the shared telephone number may receive an incoming telephone call.

Moreover, in the above communication system, the terminal identifiers managed by the shared managing means may include a terminal identifier identifying a main communication terminal to which only the shared telephone number is assigned as a telephone number.

According to this configuration, by installing the main communication terminal at home, and a member of the family carries out communication terminals to which both a shared telephone number and an individual telephone number are assigned, when the family is at home, a member of the family at home may receive an incoming call to the shared telephone number by the main communication terminal, and when the family is not at home, any one of the members of the family may receive the call by carried communication terminal.

In the above communication system, a terminal identifier stored in an electronic medium, which is installed in a communication terminal to which the shared telephone number and the individual telephone number are assigned, may be only the terminal identifier correlated with the individual telephone number.

According to this configuration, both the shared telephone number and an individual telephone number may be assigned even to a communication terminal in which only an electronic medium such as a SIM card or the like is installed.

In addition, in the above communication system, at least two or more user information managed by the user information managing means may be stored in a single call control device e.

According to this configuration, when the call control device controls a call, the configuration enables to reduce the number of transfer of signals between call control device for obtaining user information.

Moreover, in order to resolve the aforementioned problem, the present invention provides a communication method carried out by a communication system carrying out call control of a communication terminal to which a shared telephone shared by a plurality of communication terminals and an individual telephone number dedicated to a user's own terminal are assigned, said communication method comprising: a main shared calling step of calling either a part or all of terminals to which at least the shared telephone number is assigned as the telephone number when an incoming call to the shared telephone number is received; and a shared calling step of calling a communication terminal to be called next to which both the shared telephone number and the individual telephone number are assigned when there is no answer from the communication terminal called in the main shared calling step within a predetermined time.

According to this configuration, by installing the main communication terminal at home, and a member of the family carries out communication terminals to which both a shared telephone number and an individual telephone number are assigned, when the family is at home, a member of the family at home may receive an incoming call to the shared telephone number by the main communication terminal, and when the family is not at home, any one of the members of the family may receive the call by carried communication terminal.

Alternatively, the above communication method is further included an individual calling step of calling a communication terminal to which the individual telephone number is assigned when an incoming call to the individual telephone number is received.

According to this configuration, a communication terminal to which a shared telephone number and an individual telephone number are assigned may be called with the individual telephone number or the shared telephone number.

Advantageous Effect of the Invention

As described above, according to the present invention, the communication system manages terminal identifiers identifying a plurality of communication terminals, respectively, to which the shared telephone number is assigned in correlation with the shared telephone number, manages a terminal identifier a identifying a communication terminal to which the individual telephone number is assigned in correlation with the individual telephone number, and manages user information such as base station information and the like of these terminal identifiers. Based on this information, this makes it possible to make incoming and outgoing calls by any of the shared telephone number and the individual telephone number from/to the communication terminal, thus making available both of the shared telephone number and the individual telephone number for a single communication terminal

BRIEF DESCRIPTION OF THE DRAWINGS

FIG. 4 is a diagram illustrative of process of outgoing call processing executed by the communication system according to this embodiment;

DESCRIPTION OF EMBODIMENTS

Figure 1:
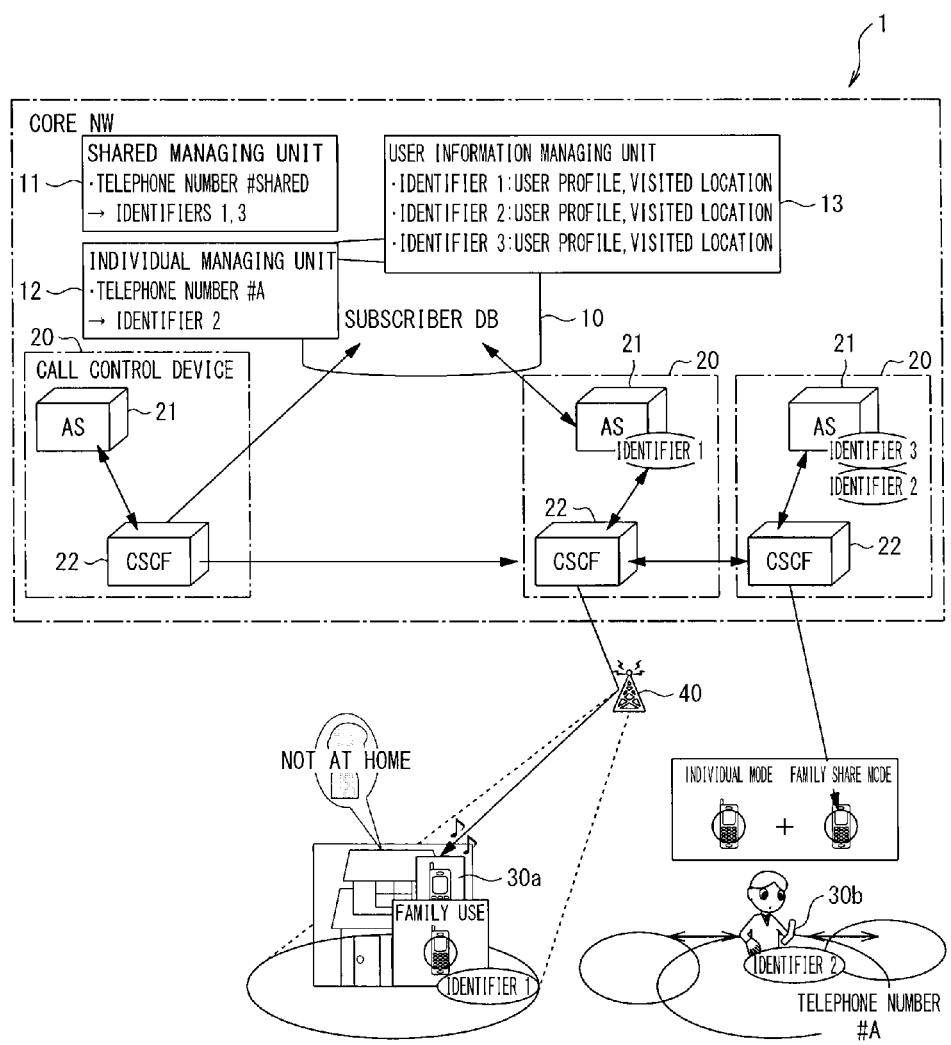
FIG. 1 is a block diagram illustrative of an overall configuration of a communication system according to an embodiment of the present invention.

Hereinafter, an embodiment of the present invention will be described with reference to the drawings. Note that the same components as in other drawings are indicated by the same reference numerals in the respective drawings referenced in the following description.

(Overall System Configuration)

FIG. 1 is a block diagram illustrative of an overall configuration of a communication system according to an embodiment of the present invention. The communication system according to this embodiment is an IP multimedia subsystem (IMS)-based communication system. As shown in FIG. 1, the communication system includes a subscriber database (DB) 10 and a call control device 20 as a core network, which relays intercommunication between communication terminals 30a and 30b via a base station 40. In this embodiment, the communication terminal 30a shall be a mobile communication terminal installed in a home, and the communication terminal 30b shall be a mobile communication terminal possessed by each of member of the family. Note that while in the present embodiment an explanation will be made on the assumption that there is one communication terminal 30b possessed by one member of the family in this embodiment, there may be multiple communication terminals 30b. Also, note that in the following description, the terminology 'communication terminal 30' is used generically when making an explanation with no distinction between the communication terminal 30a and the communication terminal 30b.

The communication terminal 30a serves as a main home telephone and is only assigned a shared telephone number as a telephone number. In this embodiment, an SIM card in which 'identifier 1' as a terminal identifier is stored is installed in the communication terminal 30a, and a 'telephone number # shared' is assigned as the telephone number. The communication terminal 30a is not limited to a mobile communication terminal, and may be a fixed-line telephone. Moreover, the shared telephone number is not limited to a telephone number for a mobile phone, and may be a telephone number for a fixed-line telephone such as OABJ.

The communication terminal 30b is a mobile communication terminal to which both the shared telephone number and an individual telephone number are assigned. In this embodiment, an SIM card in which 'identifier 2' as a terminal identifier is stored is installed in the communication terminal 30b, and 'telephone number #A' is assigned as the telephone number. Meanwhile, information of the shared telephone number is managed by the subscriber DB 10.

The subscriber DB 10 is a database server managing user information of a subscriber who has made a communication service contract using the communication system 1, and is stored information to be required in for call control processing by the call control device 20.

As shown in FIG. 1, the subscriber DB 10 includes a shared managing unit 11, an individual managing unit 12, and a user information managing unit 13. These managing units 11, 12, and 13 are databases provided in a storage unit such as a hard disc etc.

The shared managing unit 11 manages terminal identifiers identifying each of multiple communication terminals 30 to which a shared telephone number is assigned, in correlation with the shared telephone number. In the example shown in FIG. 1, 'identifier 1' identifying the communication terminal 30a to which a shared telephone number 'telephone number # shared' has been assigned, and 'identifier 3' indentifying the communication terminal 30b, are managed in correlation with the shared telephone number. Here, the terminal identifiers use International Mobile Subscriber Identity (IMSI), for example. The telephone numbers use Mobile Station International ISDN Numbers (MSISDNs) or public user IDs.

The individual managing unit 12 manages the terminal identifier identifying the communication terminal 30b to which an individual telephone number is assigned, in correlation with the individual telephone number. The terminal identifier managed by the individual managing unit 12 is stored in the SIM card loaded in the communication terminal 30b. In the example shown in FIG. 1, 'identifier 2' identifying the communication terminal 30b to which the individual telephone number 'telephone number #A' has been assigned is managed in correlation with the individual telephone number.

Namely, while in this embodiment, the individual telephone number 'telephone number #A' and the shared telephone number 'telephone number # shared' are assigned to the communication terminal 30b, only the terminal identifier 'identifier 2' corresponding to the individual telephone number 'telephone number #A' is stored in the SIM card installed in the communication terminal 30b. The terminal identifier 'identifier 3' and the corresponding shared telephone 'number telephone number # shared' are managed by the shared managing unit 11 of the subscriber DB 10 and are not stored in the SIM card. Note that this is mere one embodiment, and an additional SIM card may be installed in the communication terminal 30b, and the terminal identifier 'identifier 3' may be stored in that SIM card.

The user information managing unit 13 manages location information (namely, information of a CSCF 22 of the call control device 20 in which IP addresses and the like of the communication terminals 30 in the IMS are registered) indicating location areas of the respective communication terminals 30 identified by the respective terminal identifiers, and user information such as a user profile for every one of the terminal identifiers managed by the shared managing unit 11 and the individual managing unit 12. Here, it should be understood that the 'identifier 2' and the 'identifier 3' are terminal identifiers for the same communication terminal 30b, and thus the same location information associated with these terminal identifiers is managed. Moreover, the 'identifier 1' and the 'identifier 3' are terminal identifiers for the same shared telephone number, and thus the profile regarding the same shared telephone number in correlation with these terminal identifiers is managed. Note that in this embodiment, while an explanation will be made on the assumption that location information is described as information of the call control device 20 (CSCF 22) grasping the IP addresses of the communication terminals 30, it is not limited thereto, and in the case where the system has a different configuration, it may sometimes indicate a call control device 20 centrally managing base station 40, which covers the communication terminals 30.

(Logical Configuration of Subscriber DB)

Figure 2:
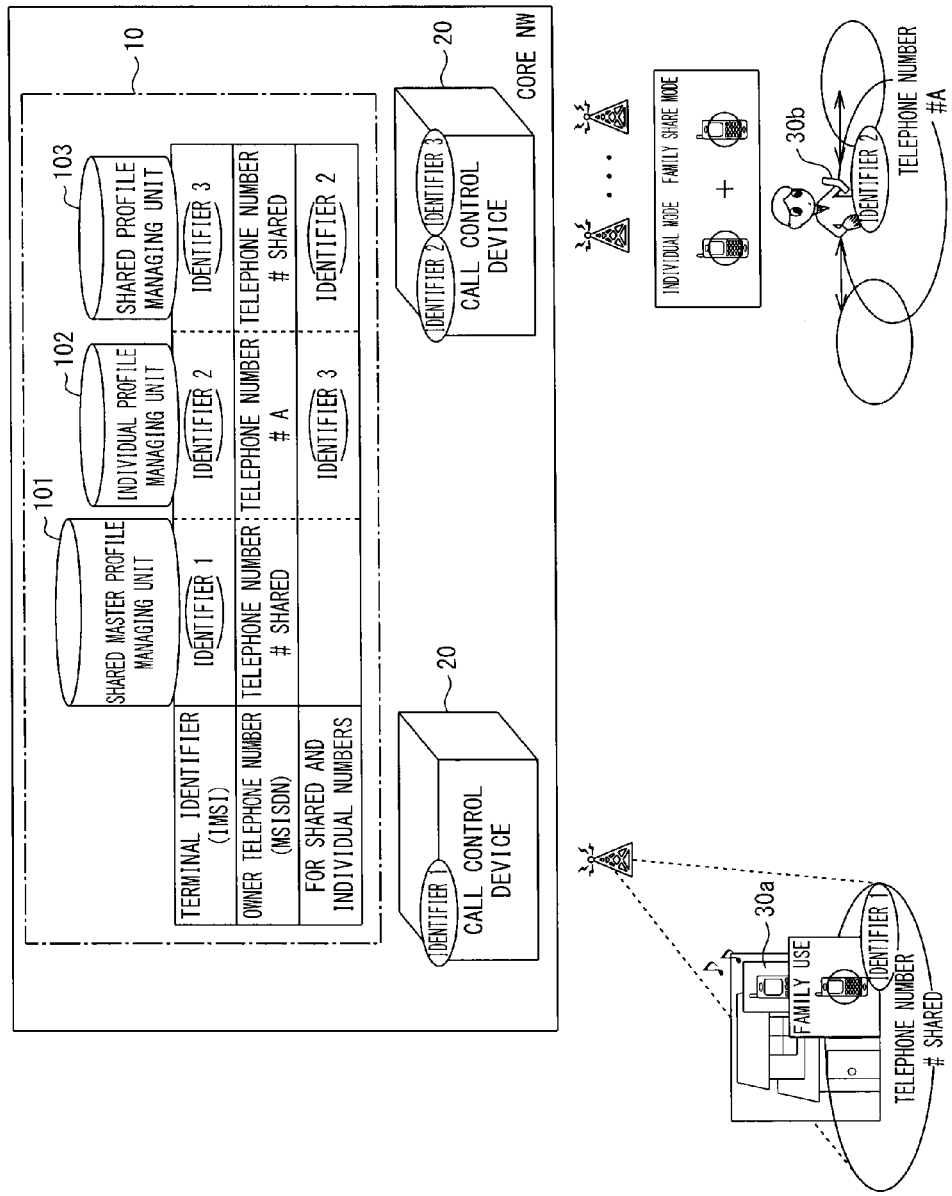
FIG. 2 is a diagram illustrative of a logical configuration of data stored in a subscriber DB according to this embodiment.

FIG. 2 is a diagram illustrative of a logical configuration of data stored in the subscriber DB 10. The subscriber DB 10 is constituted by a shared master profile managing unit 101, an individual profile managing unit 102, and a shared profile managing unit 103. Herein, correlation with FIG. 1 will be mentioned. The individual profile managing unit 102 includes the information managed by the individual managing unit 12 shown in FIG. 1, and the shared master profile managing unit 101 and the shared profile managing unit 103 include the information managed by the shared managing unit 11 shown in FIG. 1.

A profile of the shared telephone number is managed by the shared master profile managing unit 101. In this embodiment, the terminal identifier managed by the shared master profile managing unit 101 is 'identifier 1', and the telephone number is 'telephone number # shared'. Moreover, in the case where there is no answer when calling the communication terminal 30a, a calling order list for the communication terminal 30b to be called next and additional services such as voice mail, melody call and the like are managed by the shared master profile managing unit 101.

The profile for the individual telephone number is managed by the individual profile managing unit 102. In this embodiment, in addition to the 'identifier 2' as the terminal identifier for the communication terminal 30b and the 'telephone number #A' as the telephone number, information that the user uses the shared telephone number is stored as profile information, 'identifier 3' is managed as an identifier for that shared telephone number, and location information for the communication terminal 30b is managed.

The profile for the shared telephone number is managed by the shared profile managing unit 103. In this embodiment, the 'identifier 3' is managed as an identifier for the communication terminal 30b, the 'identifier 2' is managed as an identifier for the individual telephone number, and location information of the communication terminal 30b is managed. Here, the reason why the terminal identifier corresponding to the shared telephone number 'telephone number # shared' is taken as the 'identifier 3' instead of 'identifier 1' is for preventing location information of the communication terminals 30 to which the same shared telephone number is assigned from being overwritten. This allows discrimination of location information of the respective communication terminals 30 sharing the shared telephone number, not to hinder processing of an incoming call.

Note that in the case where there exist multiple communication terminals 30b rather than one to which both the shared telephone number and an individual telephone number are assigned, it has only to assign 'identifier 4' as the terminal identifier, 'telephone number #B' as the telephone number, 'identifier 5' as an identifier for the shared telephone number, . . . and so on based on the same rules as given in the above.

Returning to FIG. 1, the call control device 30 includes an application server (AS) 21 and a call session control function (CSCF) 22.

The AS 21 downloads a registered user profile of a communication terminal 30 (a correlation between telephone number and terminal identifier, a calling order in the communication terminal 30b to which the shared telephone number is assigned) from the subscriber DB 10 and manages it. Moreover, the AS 21 is stored with a call control program, and manages the CSCF 22 to conduct call control. The CSCF 22 manages the IP addresses and public user ID/private user IDs of the communication terminals 30, and sends an SIP message to the communication terminals 30.

In the case where there exist multiple communication terminals 30b to which both the shared telephone number and an individual telephone number are assigned, exchange of signals between call control device 20 during call control may be reduced through management by managing the same call control device 20.

The AS 21 identifies the IP address from the public user ID based on the calling out order via the CSCF 22 and carries out call control.

(IMS Registration Process)

Figure 3:
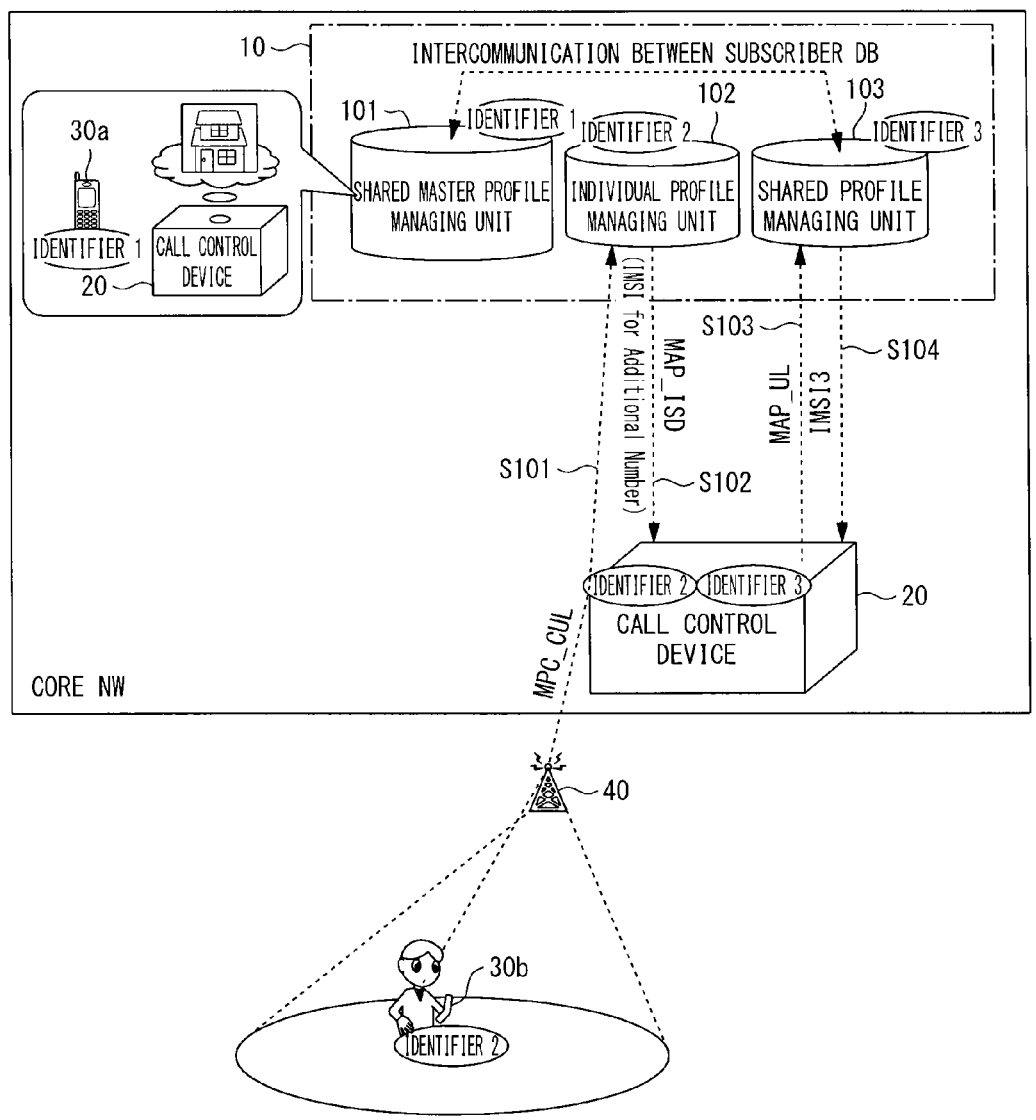
FIG. 3 is a diagram illustrative of process of a location registration processing executed by the communication system according to this embodiment.

Next, steps of an IMS registration process carried out by the communication system 1 will be described with reference to FIG. 3.

When the IMS registration process is carried out by a user possessing the communication terminal 30b within a service area of the base station 40, the communication terminal 30b sends an IMS registration signal including the identifier 2 to the subscriber DB 10 via the CSCF 22 and the destination base station 40 (step S101).

The subscriber DB 10 registers the CSCF 22 or a registration location of the identifier 2 in this step. The subscriber DB 10 then notifies the call control device 20 of the identifier 2 user profile with reference to pre-registered information, and notifies the call control device 20 that an additional telephone number has been assigned to the communication terminal 30b (step S102).

Upon reception of a notification from the subscriber DB 10, the AS 21 manages user profile 2 of the identifier 2 in the database and resends a location registration signal to the subscriber DB 10 (step S103). Thereby, the subscriber DB 10 registers the CSCF 22 or registration location of the identifier 3 corresponding to the additional telephone number, and then notifies the call control device 20 of user profile of the identifier 3 (step S104). The call control device 20 manages user profile of the identifier 3 in the database upon reception of a notification from the subscriber DB 10.

(Outgoing Call Processing)

Next, processes of outgoing call processing are described with reference to FIG. 4.

First, a user manipulates the communication terminal 30b to make an outgoing call using the shared telephone number, for example. Doing like this, the communication terminal 30b sends to the AS 21a call signal including information on a call using a destination telephone number and the shared telephone number (step S201).

Upon reception of the call signal from the communication terminal 30b, the AS 21 determines that it is an outgoing call from the shared telephone number out of the two telephone numbers based on the information including the call signal. The AS 21 acquires information regarding the shared telephone number and location information of the destination from the subscriber DB 10 (steps S202 to S203), and then makes an outgoing call using the shared telephone number in a usual calling order (step S204).

(Incoming Call Processing)

Figure 5:
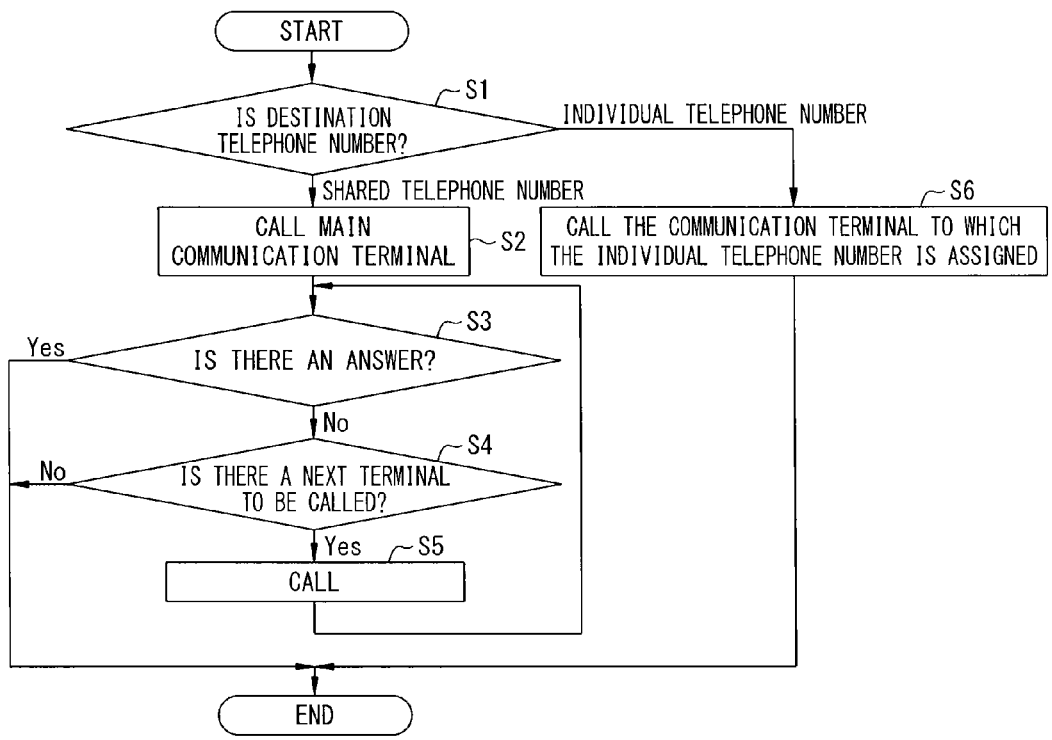
FIG. 5 is a flowchart showing a basic flow of incoming call processing executed by the communication system according to this embodiment.

Incoming call processing will next be described. First, a basic flow of the arrival process is described with reference to FIG. 5.

When an incoming call is received by the shared telephone number, the communication system 1 calls for the communication terminal 30a to which only the shared telephone number is assigned as a telephone number (step S2).

In the case where there is no answer from the communication terminal 30a within 20 seconds that is a timer value, for example, from start of calling (step S3; No), the communication terminal 30b to be called next from the communication terminals 30b to which the shared telephone number is assigned is determined based on the calling order list (step S4; Yes), and the communication terminal 30*b* is called (step S5). When there is no answer (No in step S3), processing from steps S3 to S5 is repeated until an answer is received. Note that when there is no communication terminal 30*b* to be called next (No in step S4), the process is terminated.

Meanwhile, in the case where the destination telephone number is an individual telephone number, the communication terminal to which the individual telephone number is assigned is called following in a typical publicly known order (step S6).

(Exemplary Operation of Incoming Call Processing)

Figure 6:
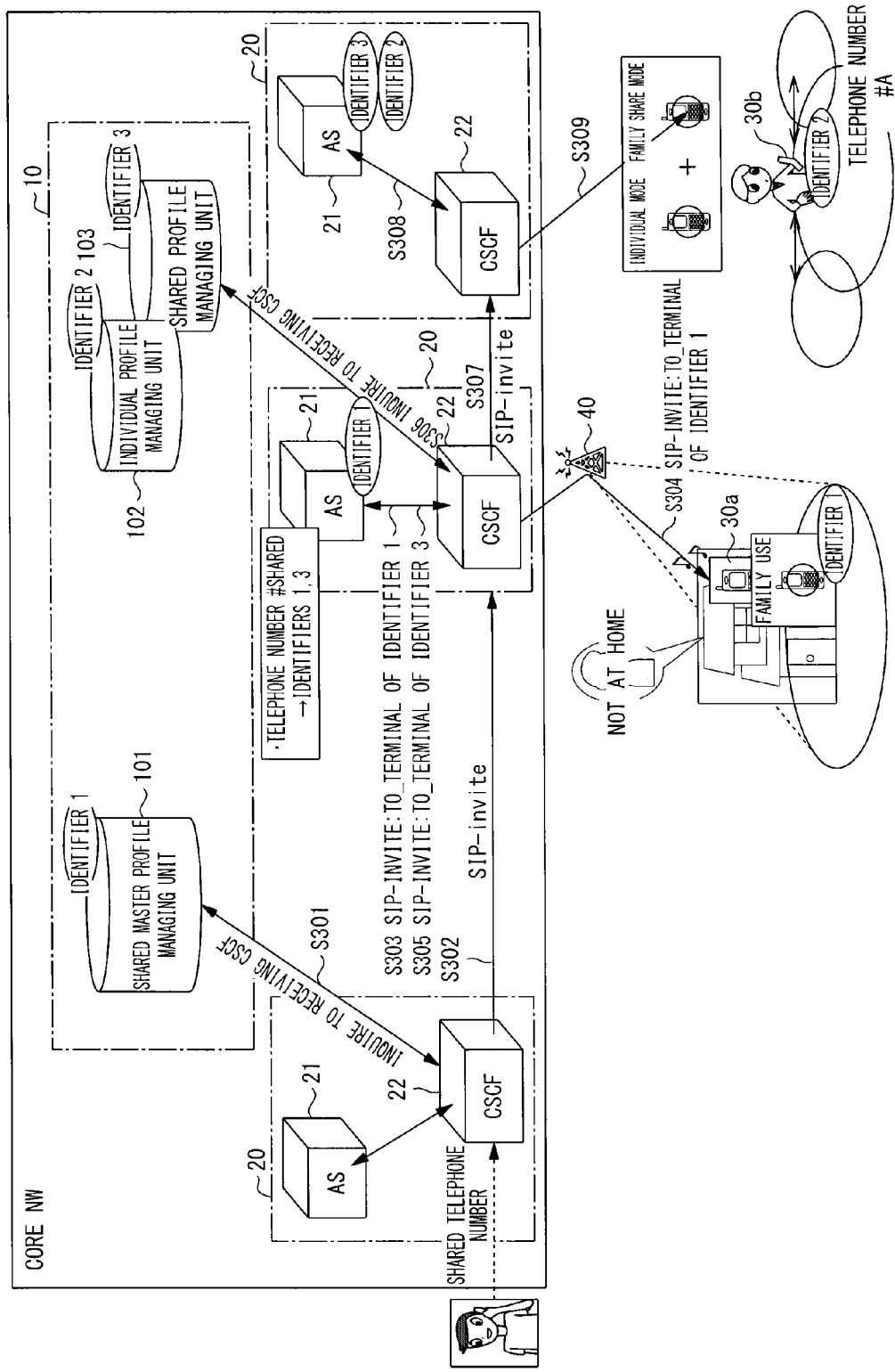
FIG. 6 is a diagram illustrative of an exemplary operation of an incoming call to a shared telephone number according to this embodiment.

Next, an exemplary operation of an incoming call to a shared telephone number will be described with reference to FIG. 6.

First, upon reception of a call signal the shared telephone number 'telephone number # shared', the calling call control device 20 acquires from the subscriber DB 10 information of the call control device 20, which has registered the communication terminal 30*a* to which only the shared telephone number is assigned as a telephone number (step S301). The calling call control device 20 then sends a call message to the CSCF 22 in which the communication terminal 30*a* is registered (step S302).

The called control device 20 that has received the call message confirms calling for the communication terminal 30*a* correlated with the 'telephone number # shared' based on a call control program installed in the AS 21 (step S303), and then calls for the communication terminal 30*a* identified by the 'identifier 1' (step S304).

In the case where there is no answer from the communication terminal 30*a* even after 20 seconds that is a timer value has elapsed, for example, from the beginning of calling, the call control device 20 confirms that the communication terminal 30*b* to be called next to which the same shared telephone number is assigned is the communication terminal 30*b* identified by the 'identifier 3' (step S305), inquires to the subscriber DB 10 about the CSCF 22 by which the communication terminal 30*b* identified by the 'identifier 3' is registered (step S306), and sends a call message to the CSCF 22 (step S307).

The call control device 20 that has received the call message for the communication terminal 30*b* inquires the AS 21 of a user profile of the communication terminal 30*b* (step S308), and then the communication terminal 30*b* receives an incoming call to the shared telephone number (step S309). Note that when the communication terminals 30*a* and 30*b* are registered in the same call control device 20, processing from steps S306 to S308 may be omitted. Namely, registering in the same call control device 20 allows reduction in the number of exchange of signals between call control device 20.

As described above, the shared managing unit 11 manages the shared telephone number and terminal identifiers identifying the respective multiple communication terminals 30 to which the shared telephone number is assigned in correlation with the shared telephone number, the individual managing unit 12 manages individual telephone numbers and terminal identifiers identifying the respective multiple communication terminals 30 to which the individual telephone numbers are assigned in correlation with the individual telephone numbers, and the user information managing unit 13 manages user information such as location information and the like of these terminal identifiers. Based on this information, this makes it possible to make incoming and outgoing calls using any of the shared telephone number or the individual telephone number from/to the communication terminal 30*b* to which both the shared telephone number and the individual telephone number are assigned, which makes both the shared telephone number or the individual telephone number available for a single communication terminal 30*b*.

This allows a personal-dedicated communication terminal 30*b* possessed by any one of members of the family to receive an incoming call to the communication terminal 30*a*, installed in a house while, for example, all the members of the family are not at home. This provides registering a shared telephone number available regardless of where the communication terminal is located. Further, sharing the shared telephone number among employees worked in a certain company, not only among the family, enables to receive an incoming call to the communication terminal 30*a* installed at the company while all of the employees are out of office by a personal-dedicated communication terminal 30*b* possessed by any one of the employees at other place where any one of the employees has gone.

As a result, it eliminates the need for a user who had been possessed terminals for respective telephone numbers until then to carry about plural terminals to use both the conventional personal-dedicated telephone number and a telephone number shared by a group such as a family or the like.

Moreover, the data managing method carried out by the subscriber DB 10 according to the present invention allows use of the two telephone numbers, namely, a shared telephone number and an individual telephone number in a communication terminal 30*b* without installing two SIM cards therein.

Furthermore, the adoption of an access-independent-based system called as an IP Multimedia Subsystem (IMS) (core network) allows to offer the same service even in different wireless communication networks (W-LAN, S3G, WiMAX, and the like). The present invention may also be applied to services.

(Modifications)

While the embodiment of the present invention has been described, the present invention is not to be limited thereto, and various modifications may be made within the technical idea of the claimed invention. The following may be given as modifications.

(1) The device configuration of the communication system 1 according to the above embodiment is a mere example, and it may be configured by multiple devices or by a single device. Moreover, the subscriber DB 10 may be configured by multiple devices, and the call control device 20 may be configured by a single device.

(2) While in the above embodiment, the description is made assuming that when an incoming call to the shared telephone number is received, the communication terminal 30*a* to which only the shared telephone number is assigned as a telephone number is called first, not limited thereto, a communication terminal 30*b* to which both the shared telephone number and an individual telephone number are assigned may be called first. Moreover, the number of communication terminals 30 to be called may be one or more than one.

(3) While in the above embodiment, the description is made supposing that when there is no answer from the called communication terminal 30*a*, the communication terminals 30*b* to which both the shared telephone number and an individual telephone number are assigned are called in a predetermined order, all of the communication terminals 30*b* to which both the shared telephone number and an individual telephone number are assigned may be called at once but not in order.

Figure 7:
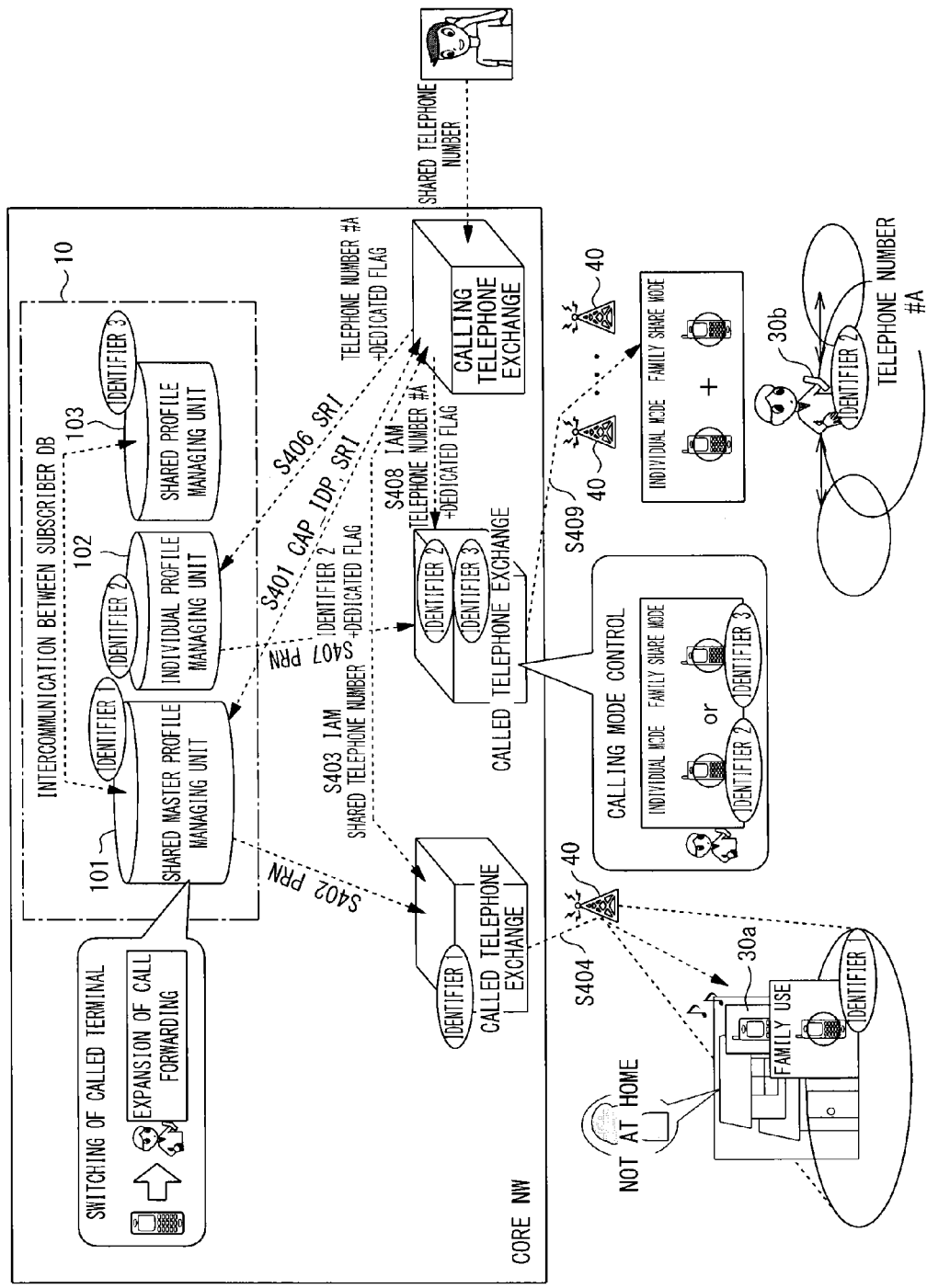
FIG. 7 is a diagram illustrative of an exemplary operation of an incoming call to a shared telephone number according to a modification.

(4) While in the above embodiment, the description is made supposing that the communication system is a system based on IMS, it may be a telephone exchange-based system. In the telephone exchange-based system, location information is managed as information indicating call control device 20 centrally managing base stations 40, which cover the communication terminals 30. Process of the incoming call to the shared telephone number in this case are as shown in FIG. 7, for example.

First, a calling telephone exchange that has received a call signal to a shared telephone number sends to the subscriber DB 10 a signal for confirming a state of a communication terminal 30a to which only the shared telephone number is assigned as a telephone number (step S401). The subscriber DB 10 sends a paging signal to the calling telephone exchange (step S402), confirms the state of the communication terminal 30a, and notifies the confirmation result to a called telephone exchange. In the case where the communication terminal 30a is confirmed to be in a state capable of receiving a call, the calling telephone exchange sends a call signal for calling using the shared telephone number to the called telephone exchange (step S403).

The called telephone exchange then calls the communication terminal 30a (step S404). When there is no answer from the communication terminal 30a within 20 seconds that is a timer value, for example, from the beginning of calling, the calling telephone exchange inquires to the subscriber DB 10 for the communication terminal to be called next (step S405), and then recognizes that the next communication terminal to be called is a communication terminals 30b to which 'telephone number #A' is assigned.

The calling telephone exchange sends to the subscriber DB 10 a signal including the 'telephone number #A' and a dedicated flag indicating that the signal is an incoming call to the shared telephone number (step S406). The subscriber DB 10 sends a paging signal including 'identifier 2' managed in association with the 'telephone number #A', and a dedicated flag to the calling telephone exchange (step S407), confirms the state of the communication terminal 30b, and notifies the confirmation result to the calling telephone exchange. In the case where the communication terminal 30b is confirmed to be in a state capable of receiving a call, the calling telephone exchange sends a signal including the 'telephone number #A' and a dedicated flag to the called telephone exchange managing the 'identifier 2' (step S408).

The called telephone exchange determines from the fact that the signal received from the calling telephone exchange includes a dedicated flag indicating that a calling mode is a shared mode in which calling out is performed using the shared telephone number, and calls the communication terminal 30b using the shared telephone number (step S409).

REFERENCE SIGNS LIST

1 communication system
10 subscriber DB
11 shared managing unit
12 individual managing unit
13 user information managing unit
101 shared master profile managing unit
102 individual profile managing unit
103 shared profile managing unit
20 call control device
30, 30a, 30b: communication terminals
40: base station

The invention claimed is:

1. A communication system for carrying out call control of a communication terminal,
the communication system comprising:
a shared number managing unit configured to manage a shared number terminal identifier for identifying each of a plurality of communication terminals, respectively, to which a shared telephone number commonly shared by the plurality of communication terminals is assigned;
an individual number managing unit configured to manage an individual number terminal identifier for identifying each of the plurality of communication terminals to which an individual telephone number is exclusively assigned respectively; and
a user information managing unit configured to manage user information for each of the plurality of communication terminals, the user information including a shared user profile for the shared number terminal identifier, an individual user profile for the individual number terminal identifier, and location information of each of the plurality of communication terminals identified by either the shared number terminal identifier or the individual number terminal identifier;
wherein the communication terminal is assigned with the shared telephone number and the individual telephone number; and
wherein when an incoming call to the shared telephone number is received, the communication terminal is identified based upon the individual number terminal identifier in correlation with the shared number terminal identifier of the shared telephone number, to which the incoming call is received, managed by the shared number managing unit, the location information, the shared user profile, and the individual user profile managed by the user information managing unit, so as to make the incoming call to the identified communication terminal.

2. The communication system according to claim 1, further comprising a calling unit configured to, when an incoming call to the individual telephone number is received, make a call to a communication terminal by referring to the location information, managed by the user information managing unit, of the communication terminal identified by the individual number terminal identifier of the individual telephone number, managed by the individual number managing unit, in correlation with the shared telephone number.

3. The communication system according to claim 2, wherein the calling unit makes a call to another communication terminal to be called next out of the plurality of communication terminals identified by the shared number terminal identifier managed by the shared number managing unit if there is no answer from the communication terminal within a predetermined period when the incoming call to the shared telephone number is received.

4. The communication system according to claim 3, wherein the shared number terminal identifier managed by the shared number managing unit includes a terminal identifier for identifying a representative communication terminal to which only the shared telephone number is assigned as a telephone number.

5. The communication system according to claim 3, wherein at least two pieces in the user information managed by the user information managing unit are stored in a single call control device.

6. The communication system according to claim 1, wherein only the individual number terminal identifier of the individual telephone number is stored in an electronic medium installed in the communication terminal although the shared telephone number and the individual telephone number are assigned to the communication terminal.

7. A communication method for carrying out call control of a communication terminal,
the communication method comprising:
managing a shared number terminal identifier for identifying each of a plurality of communication terminals, respectively, to which a shared telephone number commonly shared by the plurality of communication terminals is assigned;
managing an individual number terminal identifier for identifying each of the plurality of communication terminals to which an individual telephone number is exclusively assigned respectively;
managing user information for each of the plurality of communication terminals, the user information including a shared user profile for the shared number terminal identifier, an individual user profile for the individual number terminal identifier, and location information of each of the plurality of communication terminals identified by either the shared number terminal identifier or the individual number terminal identifier;

calling either a part or all of the plurality of communication terminals to which at least the shared telephone number is assigned as a telephone number, when an incoming call to the shared telephone number is received; and if there is no answer from the communication terminal within a predetermined time, identifying the communication terminal based upon the individual number terminal identifier in correlation with the shared number terminal identifier of the shared telephone number, to which the incoming call is received, the location information, the shared user profile, and the individual user profile so as to make the incoming call to the identified communication terminal;

wherein the communication terminal is assigned with the shared telephone number and the individual telephone number.

8. The communication method according to claim 7, further comprising an individual calling step of making a call to the communication terminal to which the individual telephone number is assigned when an incoming call to the individual telephone number is received.

* * * * *